(12) United States Patent
Kazemzadeh

(10) Patent No.: US 6,534,102 B2
(45) Date of Patent: Mar. 18, 2003

(54) METHOD OF MAKING HIGH PROTEIN SAVORY SEASONING BITS

(76) Inventor: Massoud Kazemzadeh, 10025 Beard Ave. S., Bloomington, MN (US) 55431

( * ) Notice: Subject to any disclaimer, the term of this patent is extended or adjusted under 35 U.S.C. 154(b) by 0 days.

(21) Appl. No.: 09/799,198

(22) Filed: Mar. 5, 2001

(65) Prior Publication Data

US 2002/0164402 A1 Nov. 7, 2002

(51) Int. Cl.⁷ .............................. A23L 1/20; A23L 1/31; A23L 1/317
(52) U.S. Cl. .............................. 426/72; 426/74; 426/92; 426/103; 426/516; 426/518; 426/634; 426/641; 426/656
(58) Field of Search ................................ 426/516, 641, 426/92, 103, 518, 656, 72, 74, 634

(56) References Cited

U.S. PATENT DOCUMENTS

| | | | |
|---|---|---|---|
| 4,419,371 A | 12/1983 | Suderman | 426/94 |
| 4,615,901 A | 10/1986 | Yoshioka et al. | 426/656 |
| 5,021,249 A | 6/1991 | Bunick et al. | 426/96 |
| 5,283,077 A * | 2/1994 | Ray | 426/637 |
| 5,601,864 A | 2/1997 | Mitchell | 426/643 |
| 5,798,133 A | 8/1998 | Kunert | 426/438 |
| 5,846,580 A * | 12/1998 | Franke et al. | 426/516 |
| 5,888,564 A * | 3/1999 | Fontana | 426/516 |
| 5,932,271 A * | 8/1999 | Koide et al. | 426/573 |

FOREIGN PATENT DOCUMENTS

JP  362087075 A  *  4/1987

* cited by examiner

*Primary Examiner*—Helen Pratt
(74) *Attorney, Agent, or Firm*—Patterson, Thuente, Skaar & Christensen, PA

(57) ABSTRACT

Shaker delivered savory or sweet seasoning bits formed into various shapes and formats, made from a high protein stabilized crunchy matrix with savory or sweet flavoring and seasonings imbedded within its matrix and coated on the surface thereof.

22 Claims, No Drawings

METHOD OF MAKING HIGH PROTEIN SAVORY SEASONING BITS

FIELD OF THE INVENTION

This invention relates to small bits of highly flavored food particulates with a fully developed crunchy matrix containing various seasonings imbedded, interwoven, layered, and encapsulated by a well-developed protein and carbohydrate matrix having a protein content of between about 15 and 65 percent by weight of the total recipe.

BACKGROUND OF THE INVENTION

The food industry is in a state of continuous change and readjustment based on the needs and demands of an ever-changing market. Special attention has recently been given to high protein/low carbohydrate foods for their ability to help develop muscle tissue without the problem of gaining excess weight. At the same time, many are concerned that the foods made with such composition do not have good flavor or texture or are in most cases not palatable by common consumer. This has retarded the shift in the eating habits for the final consumer and frustrated the industry to advance in the area of nutraceutical foods.

The second area of use for such products is in the area of recovery for individuals or animals that have been injured and require high quality and proteins combined with good herbs, vitamin and mineral foods in order to improve healing in a shorter time frame. A major concern of such products that contain low carbohydrates is the development of side effects due to extensive reliance on such diets for a long period of time. The side effects may include high levels of ketones in the blood stream, the sense of a lack of energy, the development of diarrhea, and finally a complete shutting down of the kidney function.

Applicant knows of no baking or extruded bits which are formulated or marketed that would carry the textural profile and are used in baking or direct consumption, with the exception of chocolate, butterscotch, or peanut butter flavored chips or food bits. The above-described chips and food bits are mainly used in the baking industry to enhance only a flavor to the final food item.

No product has been found in the market place that utilizes the high protein matrix to provide a vegetarian or gluten allergenic consumer with a crunchy high protein product to enhance or deliver a given flavor or spice taste.

There are sauces in the industry, such as A-1 Steak Sauce, that bring forth a given flavor or seasoning to completely cooked foods. In the area of salad toppings, the only products that are used for such application are bacon bits, imitation bacon bits, or seasoned crotons. None of these products are designed to carry a very high concentration of seasonings and herbs as an additional source of flavor to the main dish, nor are they designed to hold their crunchy texture in high-moisture heated foods.

U.S. Pat. No. 4,643,907 describes a product, which is used in baking as flavored chips. This product contains non-sweet savory flavored baking chips, which are used for variety of food items such as cookies cakes and others. The art discloses the matrix of such products not to be a protein-based but a carbohydrate-based matrix, which becomes easily hydrated and dissolved in a high moisture environment. Presently, this type of product is marketed as flavor bits which are in a form of flavored pieces such as blueberry, strawberry, cinnamon, and the like to be incorporated into breads and cakes, such as muffins or bagels, and baked. During the baking, the flavor chip is melted and the final product such as the muffin is then spotted with blueberry-flavored areas. There is no step to preserve the crunchiness of the chip in the final matrix. Although these chips may carry various savory or sweet flavoring, the final usage of the carbohydrate-based chips is for a completely different purpose other than having a crunchy-full-of-flavor topping that keeps their crunchy texture as well as identity under baking conditions.

U.S. Pat. No. 4,910,031 describes an art to improve savory snack foods including a no sweet, sugar-based binder, which adheres one or more toppings to a base portion of the snack. The art describes a binder or a glue like product that may be sprayed on the surface of the snack chips in order to assist in the adhesion of other seasonings or flavorings to the surface of the chip. This invention does not refer itself to particulates that are crunchy and stay crunchy under a variety of conditions and are the main carrier of seasonings and flavorings.

U.S. Pat. No. 3,974,032 describes a low D.E. starch hydrolysate having a D.E. not substantially above 20. This is a relatively narrow molecular weight distribution as its average molecular weight to the average number of molecules is less than about 20, said hydrolysate being further characterized as containing less than about 20 percent by weight, dry basis, of starch oligosaccharides having a degree of polymerization greater than about 200. Based on the above description, we conclude that the product in this art is very specific containing a very low D.E. value, and is used in order to deliver specific flavoring, which is achieved via production of such a narrow D.E. values.

Such products are developed and are marketed in order to duplicate a given natural flavor such as chicken, beef, etc. By use of single cell brewers yeast and fractionation of such particulates as to be able to remove and segregate the plasma of such organisms, the final product can duplicate such flavors as chicken, beef, etc. due to the length of such molecules, which have been isolated. There are many other methods of developing such artificial flavoring, which would mimic the real product. In our invention the purpose is not to duplicate a flavoring but to form a matrix, which can be a deliverer of seasonings and flavorings as well as holding its crunchiness during its usage in the heating or consuming process.

U.S. Pat. No. 5,084,298 refers to a product, which is a non-sweet savory flavored snack composition comprising of non-sweet carbohydrates, a bulking agent, and a savory flavoring agent. This product deals with a final finished snack product, which has been heated and cooked with a savory seasoning or flavoring in the presence of a bulking agent. The final product mentioned in this patent does not have any of the characteristics that are present in our application and its basic makeup is nothing but a carbohydrate-based snack that contains in its matrix savory flavorings and is mildly seasoned to be consume as is, without accompanying any other food. Our application is specific in that the product is not a snack, but that it contains a high seasoning base both in its proteinatious matrix as well as on its surface to carry both crunchiness as well as the strong seasoning flavor to a food item via topical application.

U.S. Pat. No. 5,021,249 refers to an invention, which consists of a free flowing savory flavor granule, comprised of a core composition having made up of non-sweet carbohydrates and a coating on to the core base comprised of a savory flavor. This product may be used in the same manner as the application referred to in our invention, and its use may be topical during consumption of the final food. However, it indicates that its matrix is a carbohydrate-based and not a proteinacious-based matrix. Thus, the crunchy texture of the final product during heating of the bits is not of concern to this invention.

SUMMARY OF THE INVENTION

The present invention is a method of making high protein savory or sweet seasoning bits. A protein source, a carbohydrate source, and a fat source, are mixed together to produce a base mixture. At least one seasoning component is mixed into the base mixture at levels of 4–40% of the total recipe. The base mixture is passed through an extruder whereby the protein matrix is developed and the seasoning is heated and incorporated as part of the matrix. The base mixture is passed through a die chamber to shape and cut the base mixture. The extruded and cut bits are then treated with oils and fats which carry additional seasoning at very high levels of 4–40%, making the final product a pocket of seasoning with high flavor profile.

Our application describes finished bits, which can be used as a topping on salad, pizza, or nacho-like foods and contain a crunchy texture which will survive a cooking process during snack making, cake, or bread making. The bits can be flavored as savory for some snacks or may be sweetened in order to be used as toppings for cookies or cakes. The high protein matrix of our bits provides a specific textural profile irrespective of what type of flavoring they may carry, sweet or savory. Once the bits are placed on the surface of the food and heated, the bits will remain crunchy. After the bits are incorporated into a cake mix or bread dough and baked, the bits will lose their crunchiness, but will maintain their distinct identity as a chewy and distinct particulate texture, flavor, and color that does not melt into the dough, and will not show as a blended flavoring.

The uniqueness of our invention deals with the texture and the consistency of crunchy texture as well as chewy texture that the high protein matrix will deliver to the final food. This texture then can be used both for the delivery of sweet or savory flavoring.

Another characteristic of this application in addition to being the deliverer of high seasoning and flavoring under this application, is its capability to seal out moisture and remain crunchy when applied to pizza, nachos, or to cookies as a crunchy topping while the product is stored and/or cooked in the oven. The fat, which encapsulates the product due to the manner of its manufacturing, seals the flavor and the crunchy texture within its matrix so that it is not effected by high humidity on the outside. A test was conducted with these products in highly moist conditions, such as mixing the product into yogurt dish, and found that the product remained crunchy for more than 48 hours. The product began losing its crunch gradually due to migration of moisture via diffusion. Therefor, it is claimed here that such processes that would require a short time of application of such seasoning bits to the surface of the food, such as pizza, nachos, cookies, and a like can utilize these products with great success during their baking and heating period without the loss of crunchiness.

DETAILED DESCRIPTION OF THE PREFERRED EMBODIMENTS

This invention is a method and a product by which highly savory or sweet seasoning is added to a high protein matrix during processing to deliver an enhanced flavoring and seasoning to the final consumer via crunchy texture either as a toping or as snack pieces.

The product of the present invention uses high protein foods with some carbohydrates along with low fats. In particular, the product has a matrix made up of proteins, carbohydrates and fats. The protein is at a concentration of between about 15 and 45 percent by weight. The carbohydrates and fibers are at a concentration of between about 15 and 45 percent by weight. The remaining matrix composition is made up of fats at a concentration of between about 5 and 45 percent by weight. The product of the present invention also preferably includes minerals and ash at a concentration of between about 3 and 15 percent by weight. These can include salts of various kinds, calcium, magnesium, phosphor, chlorides, zinc, iron, etc. in various forms or molecular structure.

In order to produce and form such a matrix, a high pressure-cooking extruder was used. The new concepts in extrusion cooking include the design of processing equipment having twin screw within a barrel, which then allows the process to carry high proteins, fiber and fats levels without causing excess shear while providing a consistent flow and high-pressure pumping action.

The twin-screw extruders are designed and used as co-rotating extruders, meaning that both screws rotate in the same direction or used as counter rotating extruders meaning that the twin screws rotate in opposite direction. The screws can be also designed to be intermeshing or non-intermeshing in their characteristic and flow pattern. The type of extruder, which was utilized in the development of these seasoning bits, was a 62 millimeters DNDG twin-screw co-rotating intermeshing extruder with pressure limits of over 3,500 pounds per square inch and long barrel design with a length over diameter ratio of about 24.

Using a twin-screw extrusion system as a processing and cooking system, a mixture of various sources of carbohydrates such as potato, corn, wheat, barley, Soya, oats, etc. are utilized in a flour or grit format and mixed with various flavorings and seasonings.

To this mixture a source of protein is added in a form of isolate or concentrate or flour at a ratio of between about 25 and 45 percent by weight for isolate, between about 35 and 65 percent by weight for concentrate, between about 45 and 85 percent by weight for flour. The protein source may be from various sources such as beans or legumes including navy, pinto, lentils, Soya beans etc. or from cereals such as gluten, gliadin, or any of the protein sources available in the market isolated from cereal grains. Other sources of protein, which may be used in this process, can be from single cell organisms, such as bacteria or yeast.

Protein sources from dairy and whey can be used in various types of casein such as sodium caseinate or potassium caseinate and whey protein isolate. Other protein sources such as dehydrated red meats, fowl meats, and fish meat can be used to produce such a matrix. Protein may also include sources such as lipoproteins, glycoproteins, metalloproteins, nucleoproteins, phosphoproteins, which are proteins existing in combination with carbohydrates, lipids, nucleic, acids, metal ions, or phosphates, some of which are digestible by humans and some are not.

Proteins can be classified in a number of ways. One useful classification is based on protein solubility. Albumins mostly from eggs are proteins, which are soluble in water. Globulins are proteins that are insoluble in pure water but are soluble in salt solutions. Most enzymes and hormone proteins belong in either the albumin or globulin class. Another group of proteins found mainly in plant seeds are the glutelins. These proteins are not soluble in either pure water or dilute salt solutions but are soluble in dilute acids or bases. Yet another class of proteins, the prolamines, are soluble in between about 70 and 80 percent by weight alcohol but are insoluble in water or neutral solvents.

The source of each of the protein will dictate the processing parameters for the extrusion system of such a product. Once the mixture of fiber, carbohydrates, proteins, and fats with mineral additives have been achieved and the corrected amount of seasoning is added, the mixture is then introduced into a chamber that carries the mixture forward while adding, if necessary, small amounts of steam to the mixture. At the end of the chamber the mixed and partially hydrated product is introduced into the extruder which continues to further mix the flour with moisture to form a high viscosity dough followed by the kneading and shearing of this dough to form a highly cooked and pressurized mass.

While the dough mass is sheared and kneaded the energy inputted via electrical or hydraulic motor turning the screws is converted into heat energy which then allows the matrix to cook and form a digestible product for human consumption.

Once the appropriate cooking, mixture, and kneading is achieved, the mass is then introduced into a die chamber under pressures of between about 200 and 1,500 pounds per square inch. At this point of the process the moisture in the product is converted to steam. As the product exits the die at a given shape and size, the pressure is release and the steam forces the product to expand and develop a texture, which is desirable by the consumer.

These shapes and sizes of product can vary from a round disc of 1–20 millimeters in diameter to rounded balls of 1–10 millimeters in diameter. These shapes are achieved when the dough is cut at the die using a face-cutting device. Another shape of similar product is made by exiting the dough at a slit die in order to form a never ending ribbon which is then cut after the matrix in the ribbon is set and partially cooled, further down the processing line.

The development of a matrix with various components such as proteins, carbohydrates, fats and minerals is essential for the correct development of the texture of the finished product. Presence of fibers, for example, will produce much higher viscosity dough, which in turn will generate a higher shear force in the system. This is due to the cellulose high absorbability of available water within the dough, which will reduce the water available to the rest of the system. Presence of minerals or high ash content in the dough will generate excess shear rate, which will be detrimental to the development of good texture within the final product. Development of a good matrix using the protein source in concentrations of about 20 percent by weight and higher is not easy and can very easily be overlooked by the investigators. To clearly understand this process some knowledge of the protein texturization and denaturation must be present.

Proteins are complex structures with molecular weight ranging from a few hundred thousand to a few million. These molecules are made up of a number of smaller molecules, which when attached to one another through a peptide bonding, form a three dimensional or quaternary structure. The primary structure of a protein molecule can be explained as a linear sequence of amino acids. It is this unique sequence of amino acids that imparts many of the fundamental properties to different proteins and determines in large measure their secondary and tertiary structure. If the proteins contain a high number of amino acids with hydrophobic groups, its solubility in aqueous solvents is reduced while proteins with a high number of hydrophilic groups will show better solubility in such solvents.

A secondary structure of protein is the three-dimensional manner in which relatively close members of the protein chain are arranged. Example of such a secondary structure is the α-helix of wool, the pleated-sheet configuration of silk, and the collagen helix. In this structure hydrogen bonding can occur between the nitrogen of one peptide bond and the oxygen of another peptide bond. This hydrogen bonding is nearly parallel to the axis of the helix, lending strength to the helical structure.

The tertiary structure of the proteins involve the folding of regular units of the secondary structure as well as the structuring of areas of the peptide chains that are devoid of secondary structure. These folded portions are held together by hydrogen bonds formed between R groups, by salt linkages, by hydrophobic interactions and by covalent disulfide (—S—S—) linkages. Disulfide linkages are the strongest bonds maintaining the tertiary structure of the protein.

Quaternary structure of the protein involves more than a single protein molecule resulting in a three dimensional or total structure of a sheet or globular proteins. In this case, a number of protein molecules may interact with one another in order to form a globular or sheeted or a fibrous structure.

During the high temperature phase in the extruder, the protein bodies will go through a glass-transition state. At this time, if enough heat energy and shear energy is provided to the dough, the protein will go through a primary, secondary, tertiary, and finally a quaternary structural melt and will reconfigure itself to yield a well developed and texturized matrix containing the seasoning. If the protein bodies are limited in the process of melting due to limited heat or shear energy, the final structure of the protein matrix will not be fully developed and will be more water soluble.

The importance of the knowledge and the solubility of the protein structure are essential in the designing an extrusion system and development of the final product texture. A water soluble protein can easily be manipulated to form the final product texture, while over heating and over shearing may totally destroy the textural profile of such a protein. The ideal condition is to form a dough matrix with the combination of fats and carbohydrates so that a highly viscose mass is formed within the extruder. This will allow the seasonings to be well imbedded within the matrix.

If, during processing the protein is not well solubilized, due to the type of protein used or due to the processing conditions imposed on the raw ingredient, the finished product will not be water-insoluble and thus will dissolve and lose its integrity during heating. The texture will be very much like a product made up of carbohydrates, or similar products. The development of the texture is conditional on the processing parameters to make the protein insoluble to the moisture in the baking process as well as making the matrix stable and strong enough to withstand hydration and drying.

The final test is the capability of the protein matrix to hold together under running water for a period of three minutes at a water rate of 10 oz. per minute at room temperature. Although this is an arbitrary standard of evaluation of the matrix development, nevertheless, it is very similar to the standards of texturization proposed by USDA at Texas A&M in 1980.

The seasonings are then introduced to high pressures of about 1,500 pounds per square inch or less while being encapsulated by the dough mass. The term seasoning in this text is referred to all herbs, spices, as well as salt, pepper, condiments and sweet or savory flavors such as lemon, lime, garlic, pizza flavoring chili-nacho flavoring, bacon bits flavoring, cheese flavorings, such as parmesan or cheddar, whether artificial, natural, or organic. Sweet flavoring may include sugar, honey, graham, molasses, fruit flavorings, chocolate, butterscotch, maple, cinnamon, etc. or a combination of any of the above types of flavorings.

These seasonings can be incorporated in to the matrix at levels of between 4 and 40 percent by weight depending on the potency of the flavoring and can be further seasoned on the outside via addition of oils and fats in a high or low temperature process. The result is that at the time where the dough leaves the die area the sudden release of pressure will allow the added seasoning to expose its internal flavoring and add a stronger dimension to the dough mass, thus allowing to produce a bit that is highly active in a given seasoning and thus provide a highly flavorful final product with a crunchy texture which is achieved from the protein matrix formed within the product structure.

The extruded texturized and cooked product is then coated via immersion into an oil and seasoning slurry at elevated temperatures of 190–265 degrees Fahrenheit. The product is then dry coated with seasonings again or sprayed with hot or room temperature oils and fats either carrying the seasonings or the seasonings are applied as dusting on the surface while the oil and fats are used to adhere the seasoning to the surface.

The final product will be highly seasoned to an extent that when applied topically to the food item such as pizza or salads the seasoning bits will carry the majority of the flavor with a strong crunch that is pleasant to the consumer. This also provides a good flavoring source for salad eaters and those who are watching their weight as well as what they eat. The matrix of such bits can be easily formulated to be gluten free and high in proteins.

In developing this type of product there were many recipes that were tested and the following recipes were considered to be the best results of the findings;

| Gluten Free:      | 1     | 2     |
|-------------------|-------|-------|
| Soya Isolate      | 37%   | 24.6% |
| Whole Potato flour| 31%   | 44.6% |
| Brown Rice flour  | 10%   | 11.7% |
| Calcium           | 1.5%  | 0.2%  |
| Chloride salt     | 2.5%  | 1.8%  |
| *Seasoning Mix    | 8.4%  | 7.0%  |
| #Mineral Mix      | 2.6%  | 0.1%  |
| Soya Oil          | 8.5%  | 10%   |
| Total             | 100%  | 100%  |

In evaluating the above samples it was noted that Sample Number 1 was very tasty and the texture was very strong. It withstood the cooking and the high humidity tests very well. On the other hand, the texture was considered by most of the tasters as too strong for some of the consumers such as aged people. The second samples were much lighter in texture and very open in cross section. They also withstood the cooking and the high humidity tests. The taste test showed good flavor development and excellent crunch. The Sample Number 2 was better accepted than Sample Number 1 by the general consumer. In both samples, the matrix was well developed and the samples withstood the cooking process.

| Wheat based Bits: | 3     | 4     |
|-------------------|-------|-------|
| Soya Isolate      | 30.7% | 29.8% |
| Whole wheat       | 22%   | 29.1% |
| Brown Rice        | 11.7% | 9.7%  |
| Sea salt          | 3.1%  | 2.8%  |
| *Seasoning Mix    | 21.3  | 12.4% |
| #Mineral mix      | 2.8%  | 0.9%  |
| Safflower Oil     | 8.4%  | 15.3% |
| Total             | 100%  | 100%  |

The above samples were both considered good enough to be used in our taste test. Sample Number 3 was very high in flavor. We were not able to cut the product at the die of the extruder without deforming the samples. Samples were not as presentable as the first two samples. When taste test was conducted it was noted that the flavoring was overwhelming and not as desirable to be consumed alone. On topical application to pizza or salads, the product was well-accepted and the usage level was dropped to compensate for the excess presence of seasoning. Sample Number 4 was acceptable with the general public and the textures were considered to be exceptional. They withstood the high humidity test as well as the cooking test. The matrix flavor on the other hand was not as well-received as the first Sample Number 2 due to the doughy taste of the matrix.

| Rice based Bits: | 5 | 6 |
|---|---|---|
| Soya Isolate | 39% | 38.2% |
| Brown Rice | 25% | 32.4% |
| Sea Salt | 1.8% | 0.9% |
| **Seasoning mix | 25% | 20.2% |
| #Mineral Mix | 1.2% | 0.9% |
| Sunflower Oil | 8.0% | 7.4% |
| Total | 100% | 100% |

The above samples were put in separate categories from savory bits. This was due to the presence of sugars and sweet carbohydrates. The texture of the product was too crystalline in the matrix and did not withstand the cooking and humidity test as well as Samples One and Two. The sweet flavorings such as maple and strawberry came through very well. They fit well for the type of application for which they were designed. This application includes mixing these bits within the dough and placing the dough in the oven to be cooked or baked. Both Sample Numbers 5 and 6 lost their crunchiness but held together well in a dough matrix and delivered a good potent flavor once the bread or bagels were cooked. From the entire sample tested, Sample Numbers 5 and 6 tended to be the best samples for the sweet bits and withstood the cooking test. During the cooking process and consumption, they maintained a strong chewy texture, a good flavor, and the integrity of the original bit.

*Seasoning mix: garlic powder, onion powder, flavorings, (pizza, chili nacho, bacon bits, and parmesan) black pepper powder, cinnamon powder, cumin powder, turmeric powder, sea salt, M.S.G. powder,

**Seasoning Mix: cinnamon powder, co-crystallized molasses powder, brown sugar, nutmeg, flavorings (maple, caramel, vanilla, chocolate, mint)

It is contemplated that features disclosed in this application, as well as those described in the above applications incorporated by reference, can be mixed and matched to suit particular circumstances. Various other modifications and changes will be apparent to those of ordinary skill.

What is claimed is:

1. A method of making high protein seasoning bits, the method comprising:
    mixing together a protein source, a carbohydrate source, a fat source, and at least one seasoning component to produce a base mixture having a protein concentration of between about 15 and 65 percent by weight;
    feeding the base mixture into an entry port on an extruder;
    injecting steam into the base mixture in the extruder;
    shearing and kneading the base mixture in the extruder to cause the protein source to undergo at least two glass phase transitions and produce a cooked product, wherein the pressures in the die chamber are between about 200 and 1,500 pounds per square inch;
    passing the cooked product through a die chamber at an exit port on the extruder, wherein steam in the cooked product causes the cooked product to expand when passing through the die chamber;
    cutting the expanded cooked product to fonn cut product bits;
    coating a surface of the cut product bits with a mixture of an oil or fat and at least one seasoning component to produce the seasoning bits, wherein the seasoning bits retain a crunchy texture when incorporated into food product by resisting absorption of water present in the food products.

2. The method of claim 1, and further comprising mixing a mineral source into the base mixture.

3. The method of claim 2, wherein a concentration of the mineral source in the base mixture is between about 5 and 15 percent by weight.

4. The method of claim 2, wherein the mineral source is calcium, potassium, copper, zinc, magnesium, iron, iodine, phosphorous or combinations thereof.

5. The method of claim 1, wherein the protein source is navy beans, pinto beans, lentil beans, Soya beans, cereal grains, bacteria, yeast, casein, dehydrated red meats, fowl meats, and fish meat, lipoproteins, glycoproteins, metalloproteins, nucleoproteins, phosphoproteins, or combinations thereof.

6. The method of claim 1, wherein the carbohydrate source is potato, corn, wheat, barley, Soya beans, oats, rice, or combinations thereof.

7. The method of claim 1, wherein the fat source is from vegetables such as corn, Soya, canola, safflower, olive, sunflower, or palm.

8. The method of claim 1, wherein the protein source undergoes primary, secondary, and tertiary glass phase transitions.

9. High protein seasoning bits comprising:
    a central region formed from a base mixture comprising a protein source, a carbohydrate source, a fat source and at least one seasoning component, wherein the protein source undergoes at least two glass phase transitions while passing through the extruder, expansion while exiting from the extruder and cutting after exiting from the extruder, and wherein the pressures in the die chamber are between about 200 and 1,500 pounds per square inch; and
    an outer coating layer that substantially covers a surface of the central region, wherein the outer coating layer is formed from an oil or fat and at least one seasoning component, wherein the seasoning bits retain a crunchy texture when incorporated into food products by resisting absorption of water into the central region, wherein the seasoning bits have a protein concentration of between about 15 and 65 percent by weight.

10. The high protein seasoning bits of claim 9, wherein the protein source is navy beans, pinto beans, lentil beans, Soya beans, cereal grains, bacteria, yeast, casein, dehydrated red meats, fowl meats, and fish meat, lipoproteins, glycoproteins, metalloproteins, nucleoproteins, phosphoproteins or combinations thereof.

11. The high protein seasoning bits of claim 9, wherein the carbohydrate source is potato, corn, wheat, barley, Soya, oats, or combinations thereof.

12. The high protein seasoning bits of claim 9, wherein a concentration of the carbohydrate source in the base mixture is between about 20 and 45 percent by weight.

13. The high protein seasoning bits of claim 9, and further comprising mixing a mineral source into the base mixture.

14. The high protein seasoning bits of claim 13, wherein the mineral source is from calcium, potassium, copper, zinc, magnesium, iron, iodine, phosphorous, or combinations thereof.

15. The high protein seasoning bits of claim 13, wherein a concentration of the mineral source in the base mixture is between about 5 and 15 percent by weight.

16. The high protein savory seasoning bits of claim 9, wherein the fat source is from vegetable oil, hydrogenated vegetable fats, animal fat or lard.

17. The high protein seasoning bits of claim 9, wherein the protein source undergoes primary, secondary, and tertiary glass phase transitions.

18. A method of making high protein seasoning bits, the method comprising:

mixing together a protein source, a carbohydrate source, a fat source, a mineral source and at least one seasoning component to produce a base mixture having a protein concentration of between about 15 and 65 percent by weight;

feeding the base mixture into an entry port on an extruder;

injecting steam into the base mixture in the extruder;

shearing and kneading the base mixture in the extruder to cause the base mixture to undergo at least two glass phase transitions and produce a cooked product;

passing the cooked product through a die chamber at an exit port on the extruder, wherein steam in the cooked product causes the cooked product to expand when passing through the die chamber, wherein the pressures in the die chamber are between about 200 and 1,500 pounds per square inch;

cutting the expanded cooked product to form cut product bits;

coating a surface of the cut product bits with a mixture of an oil or fat and at least one seasoning component to produce the seasoning bits, wherein the seasoning bits retain a crunchy texture when incorporated into food product by resisting absorption of water present in the food products.

19. The method of claim 18, wherein the protein source is navy beans, pinto beans, lentil beans, Soya beans, cereal grains, bacteria, yeast, casein, dehydrated red meats, fowl meats, and fish meat, lipoproteins, glycoproteins, metalloproteins, nucleoproteins, phosphoproteins, or combinations thereof.

20. The method of claim 18, wherein the carbohydrate source is potato, corn, wheat, barley, Soya beans, oats, rice, or combinations thereof.

21. The method of claim 18, wherein the fat source is from vegetables such as corn, Soya, canola, safflower, olive, sunflower, or palm.

22. The method of claim 18, wherein the protein source undergoes primary, secondary, and tertiary glass phase transitions.

* * * * *